(12) United States Patent
Papadopoulos

(10) Patent No.: US 11,698,152 B1
(45) Date of Patent: Jul. 11, 2023

(54) CABLE HANGER DEVICE FOR FRAMING CONSTRUCTION

(71) Applicant: George Papadopoulos, Watertown, MA (US)

(72) Inventor: George Papadopoulos, Watertown, MA (US)

(*) Notice: Subject to any disclaimer, the term of this patent is extended or adjusted under 35 U.S.C. 154(b) by 0 days.

(21) Appl. No.: 18/064,973

(22) Filed: Dec. 13, 2022

Related U.S. Application Data

(60) Provisional application No. 63/403,720, filed on Sep. 3, 2022.

(51) Int. Cl.
*F16L 3/223* (2006.01)
*H02G 3/00* (2006.01)

(52) U.S. Cl.
CPC ............. *F16L 3/223* (2013.01); *H02G 3/26* (2013.01)

(58) Field of Classification Search
CPC ... F16L 3/223; F16L 3/22; H02G 3/26; H02G 3/30; H02G 3/126; H02G 7/00; H02G 7/05
See application file for complete search history.

(56) References Cited

U.S. PATENT DOCUMENTS

| | | | |
|---|---|---|---|
| 4,372,510 A * | 2/1983 | Skypala | H02G 3/0456 248/68.1 |
| 5,090,645 A | 2/1992 | Zuercher | |
| 5,765,786 A * | 6/1998 | Gretz | H02G 3/26 248/68.1 |
| 6,390,421 B1 * | 5/2002 | Rudd | F16L 3/227 248/62 |
| 7,071,418 B2 * | 7/2006 | Brockman | H02G 3/32 174/157 |
| 7,780,122 B1 * | 8/2010 | Herbers | H02G 3/30 248/58 |
| 7,896,296 B2 * | 3/2011 | Julian | F16L 3/127 248/68.1 |
| 9,322,493 B2 | 4/2016 | Wolff | |
| 2004/0113024 A1 * | 6/2004 | Caveney | H02G 3/0456 248/68.1 |

* cited by examiner

*Primary Examiner* — Anita M King
(74) *Attorney, Agent, or Firm* — Joseph D. Hodler

(57) ABSTRACT

An improved hanger attaches to the corner of a vertical, horizontal, or angled construction member. A support member descends from the hanger and holds one or more cables against the construction member. The narrow profile of the hanger permits the placement of strapping and covering, or other construction materials, over the cables. Bumps on the support member secure the cables.

20 Claims, 7 Drawing Sheets

CABLE HANGER DEVICE FOR FRAMING CONSTRUCTION

CROSS-REFERENCE TO RELATED APPLICATIONS

The present application is a Non-Provisional Application which claims the benefit of Provisional Patent Application No. 63/403,720, filed Sep. 3, 2022.

FIELD

This invention generally relates to wire or cable fasteners positioned inside wall and ceiling framing.

BACKGROUND

During construction of a wood-framed building, builders and electricians need to run electrical cables of various sizes for power and communications throughout the walls and ceilings.

Traditional methods of running cables include drilling holes in the structure, installing conduits, or stapling the cables to studs, joists, and rafters. Conduits are complicated and costly in terms of time and materials. Drilling holes in the structure is damaging to the building. Stapling is time consuming and may harm the cables.

The construction industry has developed devices called cable hangers. They are useful for running multiple cables through walls and ceilings, without the need to staple them or build conduits. They are easier to install, they do not damage the cables, and they are flexible in that cables can easily be added or removed during the installation process.

One example of a cable hanger is described in U.S. Pat. No. 5,090,645. This cable hanger provides four parallel slots to hold multiple cables along the same path. It is designed to hold cables vertically, on the interior of a wall frame. However, there are some drawbacks. The four parallel slots extend 1.5 inches from the framing, which limits the ability to place the hanger in places requiring less clearance. Also, it has one means for attaching with a nail, making it efficient for placing on a vertical stud, but not in other positions.

An improved cable hanger, for multiple positions, vertically and horizontally, is needed to ease installation of cables in wood-frame construction.

SUMMARY

The present invention is directed to an improved cable hanger for running cables in construction framing. In one embodiment, the cable hanger has a T-shape with three members. A first member is the base member, from which two other members extend, forming the T-shape. A second member is the support member, with two arms for containing cables. A third member is the brace member, perpendicular to the support member, providing a means for attaching to a construction frame. Cables are held between the arms of the support member and the construction frame.

The present invention is an improved cable hanger because it operates in multiple positions, is easier to attach in multiple positions, and requires less space.

The present invention works on vertical construction members. One of the two arms will extend vertically upward, and the other downward. Cables may rest between the arms and the construction member.

The present invention works on horizontal construction members. The brace member will drop vertically from the horizontal construction member and both arms will extend horizontally. Cables may rest on the arms, between the arms and horizontal construction member.

The present invention works on angled construction members as well. The brace member is attached so that the arms are parallel to the angled construction member. Cables may rest between the upward angled arm and the angled construction member, with the aid of gravity towards the base member of the cable hanger.

In one embodiment, the arms are comprised of bumps on the tips. These bumps narrow the distance between the tip of the arm and the attached construction member. When a cable is run through the cable hanger, it may squeeze through the tip and rest on the arm towards the base member. The tip further secures the cable from slipping out.

Some embodiments may include additional bumps on the arms between the tips and the base member, for organizing multiple cables on the same cable hanger.

The invention is easy to attach to construction members in various positions because it may attach via a fastener, nail or screw, orthogonally through a hole in the face of the brace member, or through a second hole on the angled edge of the brace member.

In one embodiment, the invention has a low profile, and only extends as far as necessary to accommodate the diameter of one cable. This low profile allows cables to run across construction members, within the width of strapping for attaching surface materials.

One embodiment of the invention is constructed of semi-flexible plastic, permitting the arms to bend enough to allow cables to enter the space between the arms and the construction member, but rigid enough to hold them in place.

LIST OF FIGURES

DETAILED DESCRIPTION

Figure 1:
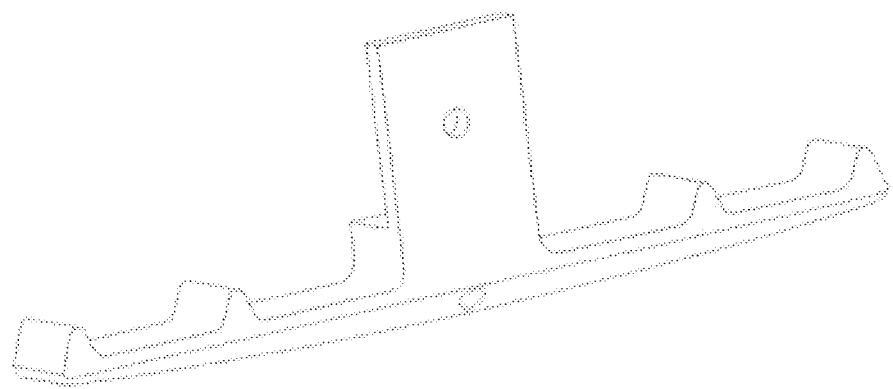
FIG. 1 is a front three-dimensional view of one embodiment of a cable hanger.
Figure 2:
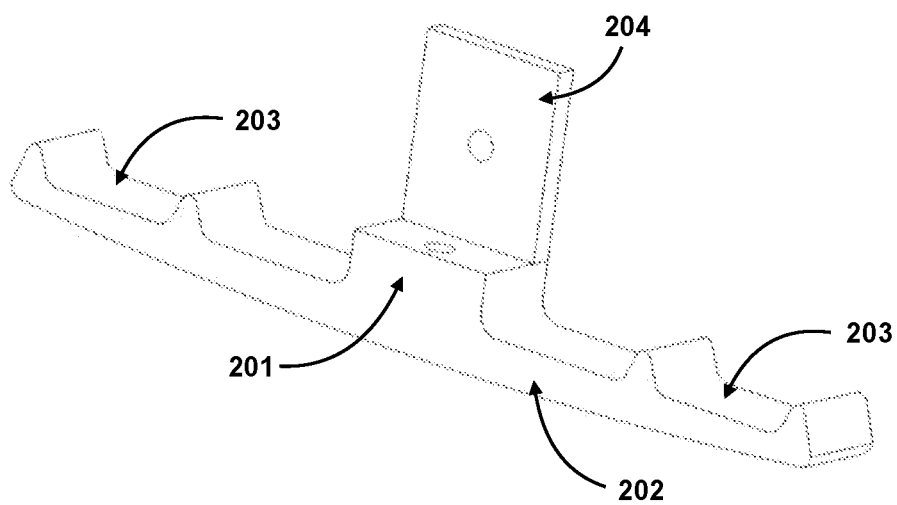
FIG. 2 is a rear three-dimensional view of one embodiment of a cable hanger.

The present invention is directed to an improved cable hanger for running cables in construction framing. In one embodiment, the cable hanger has a T-shape with three members. See FIG. 1 and FIG. 2. A first member is the base member 201, from which the two other members extend, forming the T-shape. A second member is the support member 202, with two arms 203 for supporting cables. A third member is the brace member 204, perpendicular to the support member, providing a means for attaching to a construction frame. Cables are held between the arms of the support member and the construction frame.

The present invention is an improved cable hanger because it operates in multiple positions, is easier to attach in multiple positions, and requires less space. The cable hanger may be positioned on a vertical, a horizontal, or an angled construction member.

Figure 3:
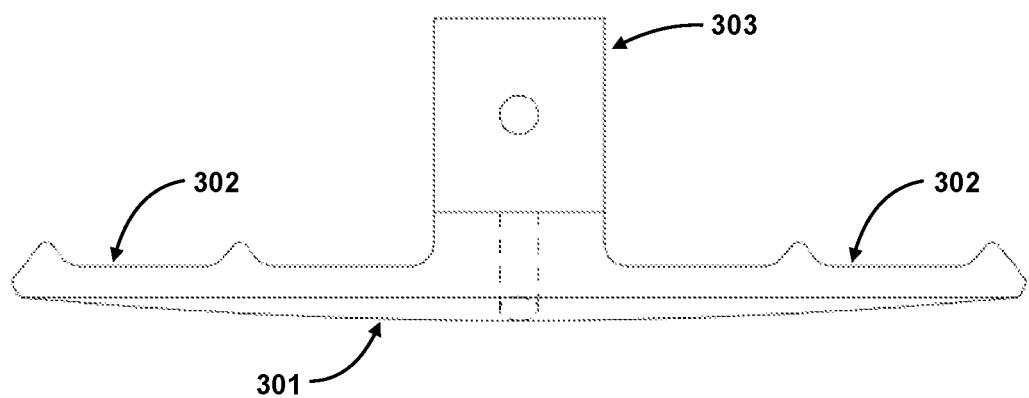
FIG. 3 is a rear view of one embodiment of a cable hanger.

FIG. 3 shows the front view of one embodiment of the cable hanger. The support member 301 is shown horizontally, along the bottom of the silhouette. The support member is comprised of two arms 302 extending from the center. In one embodiment, the total length of the support member is 5.25 inches. Longer or shorter arms are envisioned. Alternative embodiments may be L-shaped and have only one arm on the support member.

A second member of the cable hanger provides a brace for attaching the cable hanger to a construction member. Example construction members may be wooden studs, joists, or rafters. The brace member 303 extends perpendicular from the support member's arms. In one embodiment, the brace member is 1.5 inches in length, and 0.875 inches wide, although other dimensions are envisioned.

Figure 4:
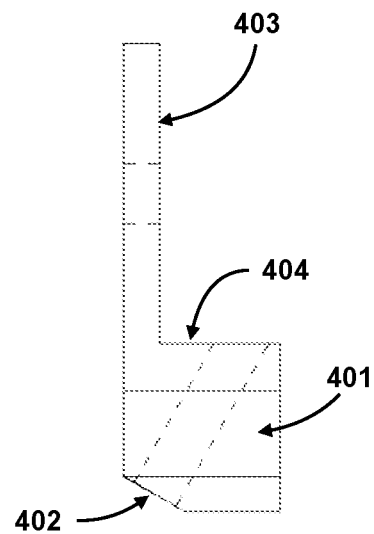
FIG. 4 is a side view of one embodiment of a cable hanger.

FIG. 4 shows the side view of one embodiment of the cable hanger. The support member 401, comprising the arms, is shown at the bottom of the figure, with an angled edge 402 running along the bottom. The brace member 403 extends up from one side of the cable hanger, providing a face to place flush against the one side of a construction member at the corner. The other side of the construction member at the corner will fit snuggly against the top of the base member 404.

In one embodiment, the brace member is 0.125 inches thick, and the base member is 0.5 inches thick. Alternative thicknesses are envisioned.

In one embodiment, the cable hanger is composed of an injection molded polymeric material, such as polypropylene. Other alternative materials are envisioned. The material should be semi-flexible and impact resistant to prevent damage during the installation and construction phase of the building. Additionally, the material should withstand a temperature range from 60 Celsius to –18 Celsius.

Figure 5:
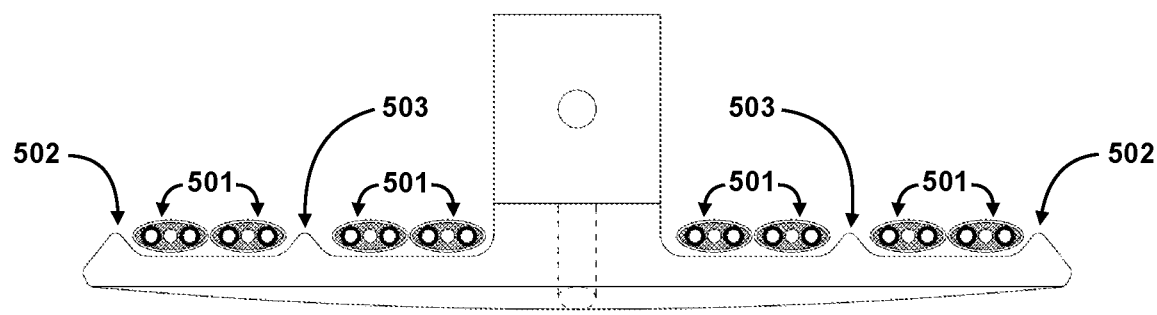
FIG. 5 is a rear view of one embodiment of a cable hanger with eight cables.

FIG. 5 shows a front view of one embodiment of the cable hanger with the cross-sections of eight power cables 501. In this position, the cables rest on the upper side of the arms. The invention can hold one or multiple cables at a time.

Figure 6:
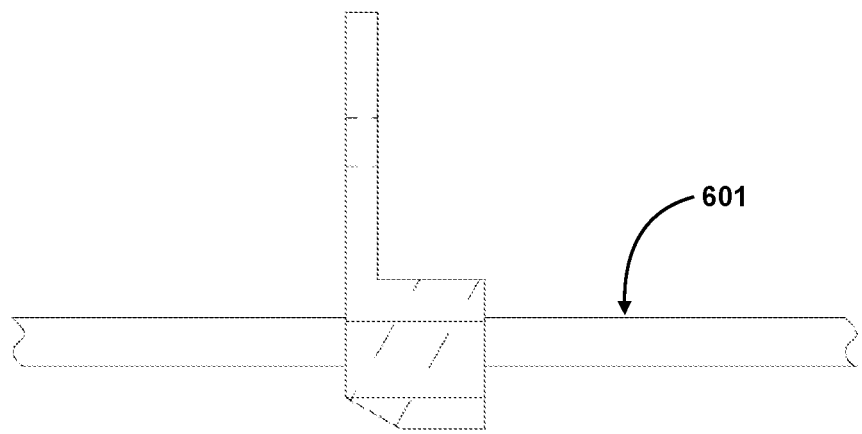
FIG. 6 is a side view of one embodiment of a cable hanger with one cable.

FIG. 6 shows a side view of one embodiment of the cable hanger with a cable 601 running through it.

Figure 7:
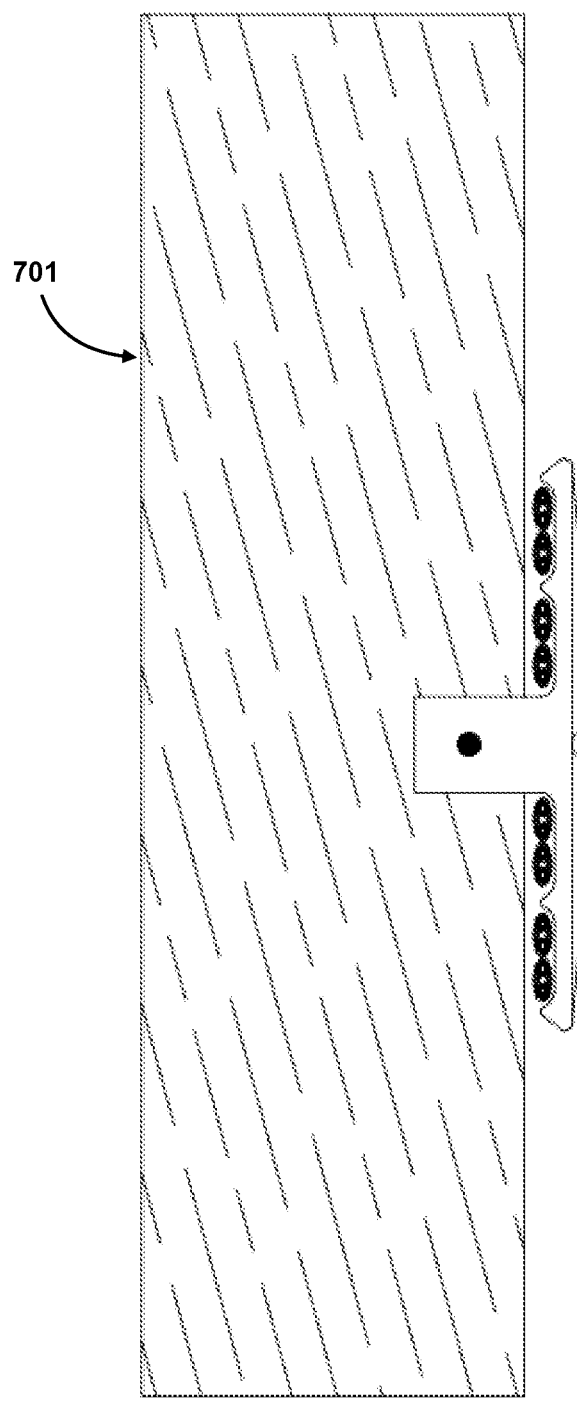
FIG. 7 shows one embodiment of a cable hanger attached to a vertical member with eight cables.

FIG. 7 shows one embodiment of the cable hanger attached to a vertical construction member 701, such as the wooden stud of a framed wall. One arm extends vertically upward, and one arm extends downward.

There are eight cables running through the cable hanger. The arms provide just enough space from the stud to fit the cables snuggly. The semi-flexible material permits the cables to squeeze into position and hold in place. Cables may be removed or rearranged easily. The four cables on the top are further secured by resting against the base member of the cable hanger under the force of gravity. Alternative embodiments may have only a vertical arm, or arms of different lengths.

Figure 8:
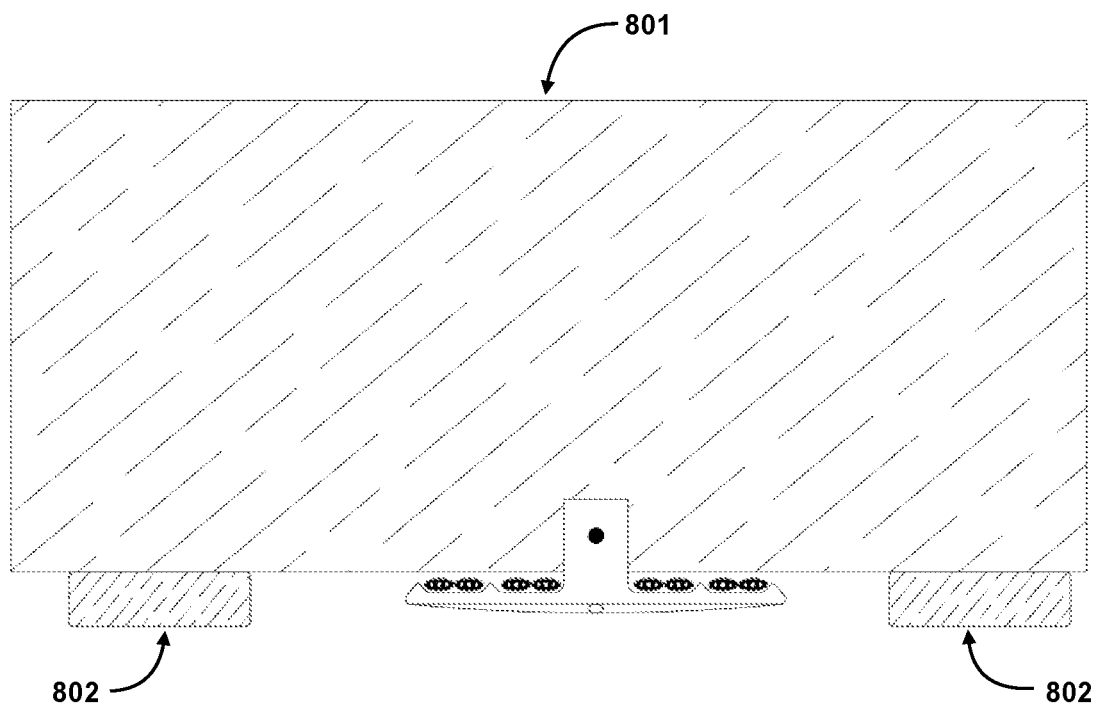
FIG. 8 shows one embodiment of a cable hanger attached to a horizontal member with eight cables.

FIG. 8 shows one embodiment of the cable hanger attached to a horizontal construction member 801, such as the wooden joist of a ceiling. The eight cables are placed snuggly between the arms and the horizontal construction member. The eight cables are further secured by resting against support member of the cable hanger under the force of gravity.

The cable hanger may also attach to an angled construction member, such as a wooden rafter. All cables will fit snuggly between the arms and the rafter, with the cables on the upper angled arm further secured by the force of gravity against the base member and upper arm of the support member.

In one embodiment of the invention, the arms have bumps on the tips. See FIG. 5. These bumps 502 prevent the cables from slipping out, by narrowing the space between the support member and the attached construction member so the cables must be squeezed through the gap. Some embodiments may include additional bumps 503 positioned on the inner portions of the arms, to better secure and organize multiple cables.

One key benefit of the invention is the low profile. Since the cables run in parallel, the cable hanger requires minimum clearance. This lesser requirement affords placing hangers in positions that require surface coverings. The embodiment in FIG. 5 shows one horizontal support member with arms supporting one row of cables.

FIG. 8 shows an example of the benefits of minimizing the profile. Two pieces of strapping 802 are shown on either side of the cable hanger attached to an overhead joist. Strapping is narrow strips of lumber placed perpendicular to joists. They provide a structure for installing drywall or other surfaces. In FIG. 8, the strapping is 0.75 inches, capable of clearing the 0.5-inch extension of the cable hanger.

Figure 9:
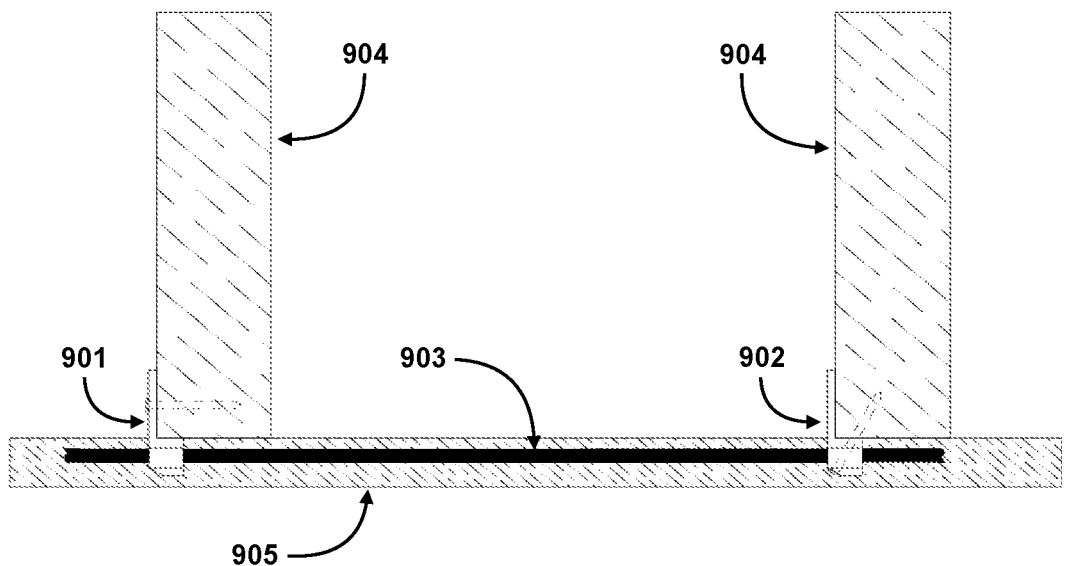
FIG. 9 shows one embodiment of two cable hangers attached to two horizontal members, running a cable within strapping.

FIG. 9 shows a side view of two cable hangers 901, 902 running a cable 903 across two joists 904. The strapping 905 extends beyond the cable hangers, creating a surface for the application of surface material.

Figure 10:
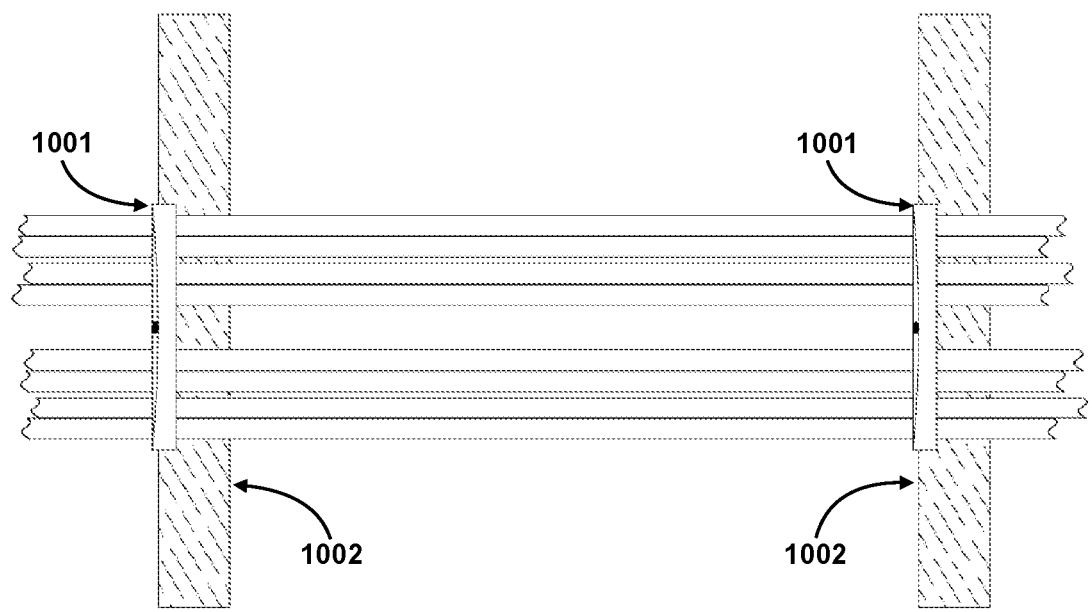
FIG. 10 shows one embodiment of two cable hangers with eight cables.

FIG. 10 shows another view of two cable hangers 1001 attached to two construction members 1002, running eight cables. This view could be of vertical, horizontal, or angled construction members.

Figure 11:
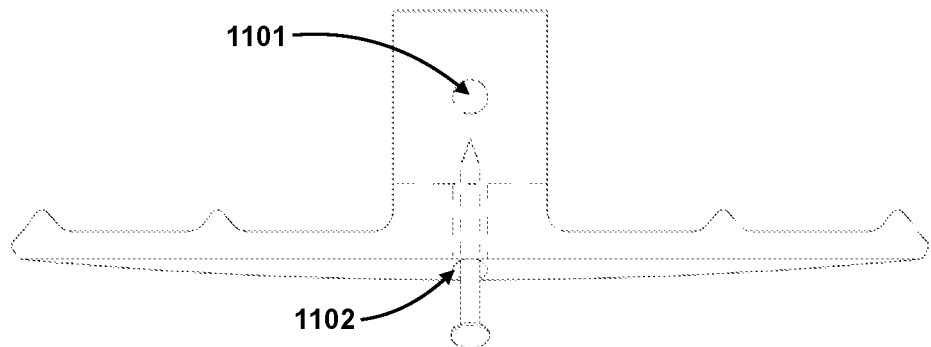
FIG. 11 is a front view of one embodiment of a cable hanger showing an attachment option.

FIG. 11 shows a front view of one embodiment of the invention. The cable hanger may have multiple means of attachment. One embodiment provides two holes for the attachment of the cable hanger. One 0.25-inch diameter hole 1101 is provided through the face of the brace member. A second 0.125-inch diameter hole 1102 is provided at an angle through the center of the base member between the two arms. Other sized holes are envisioned.

Only one fastener, nail or screw, is required to attach the cable hanger to a construction member. Depending on the position, it may be easier to utilize one hole or the other.

Figure 12:
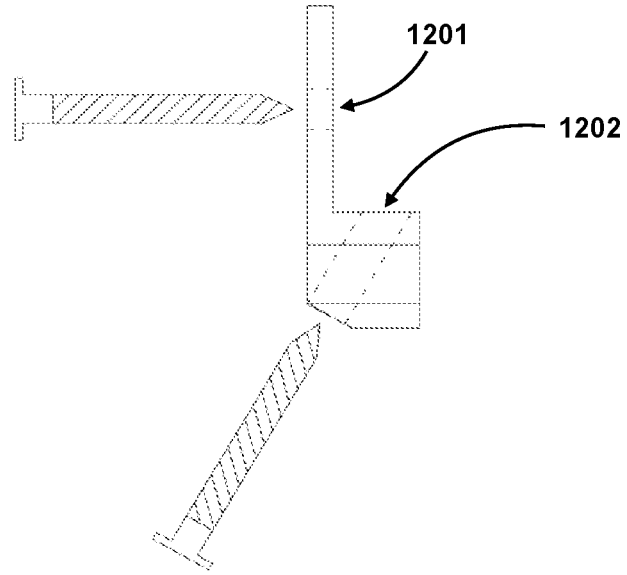
FIG. 12 is a side view of one embodiment of a cable hanger showing two attachment options.

FIG. 12 shows a side view of one embodiment of the invention. The cable hanger has two holes for alternative attachment means. One hole 1201 is provided through the face of the brace member. The second hole 1202 is provided at an angle through the center of the base member, to facilitate attachment in overhead or other awkward positions. FIG. 9 shows how one cable hanger on the left 901 may be attached through the brace member, and another cable hanger on the right 902 may be attached through the angled hole in the base member.

While the foregoing description has been directed to specific embodiments, other variations and modifications may be made to the described embodiments, with the attainment of some or all their advantages. Accordingly, this description is only an example and does not otherwise limit the scope of the embodiments herein.

The invention claimed is:

1. A cable hanger device for fastening and positioning wires and cables to a framing member, the device comprising:
   a. a base member, with a surface for positioning against a first surface at a corner of a framing member;
   b. a brace member, a flat tab with two sides extending from the base member, for attaching one side of the brace member flush to a second surface at the corner of the framing member perpendicular to the first surface of the framing member;
   c. at least one support member extending from the base member to form an arm with a tip, wherein the support member is parallel to the first surface of the framing member, creating a space between the first surface of the framing member and the support member for inserting cables; and
   d. a hole for a fastener, wherein said hole is through the base member at a non-perpendicular angle to the surface of the base member.

2. The device of claim 1, wherein the hole is through the brace member.

3. The device of claim 1, wherein the fastener is a nail.

4. The device of claim 1, wherein the fastener is a screw.

5. The device of claim 1, wherein two support members extend in opposite directions from the base member.

6. The device of claim 1, further comprising a bump on the tip of the at least one support member, narrowing the space between the support member and the first surface of the framing member.

7. The device of claim 1, further comprising at least one bump on at least one support member positioned between the base member and the tip of the at least one support member.

8. The device of claim 1, wherein the device is formed of polypropylene.

9. The device of claim 1, wherein the device is formed of plastic with a high temperature rating and impact resistance.

10. The device of claim 1, wherein the base member extends away from the framing member less than three quarters of an inch.

11. A cable hanger device for fastening and positioning wires and cables to a framing member, the device comprising:
   a. a base member, with a surface for positioning flush against a first surface of the corner of a framing member;
   b. a brace member extending perpendicular from the base member, flush against a second surface of the corner of a framing member;
   c. a support member comprised of at least one arm extending from the base member parallel to the framing member, creating a space between the at least one arm and the framing member for the insertion of cables;
   d. a narrowing of the space between the at least one arm and the framing member at a distance from the base member, capable of preventing one or more cables from slipping out of the space; and
   e. a means for attaching the device to a framing member.

12. The device of claim 11, wherein the narrowing of space is created by a bump on the tip of the at least one arm, extending towards the framing member.

13. The device of claim 11, wherein the narrowing of the space is created by a bump along the length of the at least one arm.

14. The device of claim 11, wherein the device is composed of semi-flexible material, permitting the at least one arm to bend enough to allow the insertion of a cable, and bend back to secure the cable.

15. The device of claim 11, wherein the means for attaching is a hole through the base member.

16. The device of claim 11, wherein the means for attaching is a hole through the brace member.

17. The device of claim 11, wherein the device is comprised of two holes, one through the base member and one through the brace member.

18. The device of claim 11, wherein the at least one arm is long enough to accommodate one layer of multiple cables.

19. The device of claim 11, wherein the base member extends from the framing member less than the thickness of strapping for construction surfaces.

20. The device of claim 11, wherein the base member extends from the framing member less than three-quarters of an inch.

* * * * *